United States Patent
Gordon et al.

(10) Patent No.: US 8,042,989 B2
(45) Date of Patent: Oct. 25, 2011

(54) MULTI-STAGE CAVITATION DEVICE

(75) Inventors: Roman Gordon, Studio City, CA (US); Igor Gorodnitsky, Marina del Rey, CA (US); Maxim Promtov, Tambov (RU)

(73) Assignee: Cavitation Technologies, Inc., Chatsworth, CA (US)

( * ) Notice: Subject to any disclaimer, the term of this patent is extended or adjusted under 35 U.S.C. 154(b) by 159 days.

(21) Appl. No.: 12/464,646

(22) Filed: May 12, 2009

(65) Prior Publication Data

US 2010/0290307 A1 Nov. 18, 2010

(51) Int. Cl.
*B01F 5/06* (2006.01)

(52) U.S. Cl. ............ 366/176.1; 366/338; 366/340; 138/40

(58) Field of Classification Search .......... 366/162.4, 366/181.5, 174.1, 175.2, 176.1–176.4, 336–340; 138/40; 516/928–931; 137/896
See application file for complete search history.

(56) References Cited

U.S. PATENT DOCUMENTS

| | | | | |
|---|---|---|---|---|
| 1,454,196 | A * | 5/1923 | Trood | 48/189.4 |
| 1,626,487 | A * | 4/1927 | Warren | 366/163.2 |
| 2,584,827 | A * | 2/1952 | Bailey | 366/69 |
| 3,167,305 | A * | 1/1965 | Backx et al. | 366/338 |
| 4,213,712 | A * | 7/1980 | Aanonsen et al. | 366/168.2 |
| 5,302,325 | A * | 4/1994 | Cheng | 261/76 |
| 5,937,906 | A * | 8/1999 | Kozyuk | 138/37 |
| 5,969,207 | A * | 10/1999 | Kozyuk | 422/127 |
| 6,276,823 | B1 * | 8/2001 | King | 366/181.5 |
| 6,379,035 | B1 | 4/2002 | Kubo et al. | |
| 6,935,770 | B2 * | 8/2005 | Schueler | 366/174.1 |
| 7,762,715 | B2 * | 7/2010 | Gordon et al. | 366/176.1 |
| 2003/0147303 | A1 | 8/2003 | Schueler | |
| 2007/0041266 | A1 * | 2/2007 | Huymann | 366/162.4 |
| 2007/0189114 | A1 * | 8/2007 | Reiner et al. | 366/176.2 |
| 2009/0141585 | A1 * | 6/2009 | Al-Otaibi | 366/339 |
| 2009/0182159 | A1 * | 7/2009 | Gordon et al. | 554/9 |
| 2009/0251989 | A1 * | 10/2009 | Pfefferle et al. | 366/340 |
| 2009/0314688 | A1 * | 12/2009 | Gordon et al. | 208/223 |
| 2010/0101978 | A1 * | 4/2010 | Gordon et al. | 208/49 |
| 2010/0103768 | A1 * | 4/2010 | Gordon et al. | 366/165.4 |
| 2010/0104705 | A1 * | 4/2010 | Gordon et al. | 426/238 |
| 2010/0151540 | A1 * | 6/2010 | Gordon et al. | 435/134 |
| 2010/0290307 | A1 * | 11/2010 | Gordon et al. | 366/104 |
| 2011/0003370 | A1 * | 1/2011 | Gordon et al. | 435/271 |

FOREIGN PATENT DOCUMENTS

| | | | |
|---|---|---|---|
| DE | 10310442 A1 * | 9/2004 | |
| RU | 2 265 478 C1 | 12/2005 | |
| SU | 633576 A * | 11/1978 | |
| SU | 1790438 A3 * | 1/1993 | |
| WO | 96/09112 A1 | 3/1996 | |

* cited by examiner

*Primary Examiner* — Charles E Cooley
(74) *Attorney, Agent, or Firm* — Kelly Lowry & Kelley, LLP (57) ABSTRACT

A method for processing a fluidic mixture in a multi-stage hydrodynamic cavitation device is disclosed. The fluidic mixture is introduced to an inlet and passed through a flowpath having at least ten cavitation zones. The fluidic mixture is exposed to cavitation inducing features in each of the at least ten cavitation zones to induce cavitation bubbles, which bubbles are then collapsed between every two adjacent of the at least ten cavitation zones. The multi-stage hydrodynamic cavitation device for processing the fluidic mixture has a generally cylindrical housing with an inlet, an outlet, a flowpath therebetween, and a plurality of cavitation zones along the flowpath. Two or more of the cavitation zones along the flowpath comprise a disk multi-jet nozzle having a plurality of through channels disposed across the surface thereof, wherein each channel includes expansions and contractions of its cross-sectional area along its length.

19 Claims, 4 Drawing Sheets

MULTI-STAGE CAVITATION DEVICE

BACKGROUND OF THE INVENTION

The invention relates generally to mixers and cavitation devices that are utilized for processing heterogeneous and homogeneous fluids through the controlled formation of cavitation bubbles that serve as independent chemical mini-reactors, and uses the energy released upon implosions of these cavities to alter quickly said fluids. The device may find applications in petroleum, chemical, pharmaceutical, fuel, food and other industries to prepare solutions, emulsions, and dispersions and to improve mass and heat transfer processes.

More particularly, the invention relates to modifying complex fluids composed of a number of different compounds and utilizes cavity implosion energy to improve said fluids' homogeny, viscosity, and/or other physical characteristics, alter their chemical composition by converting compounds, and obtain upgraded, more valuable products.

It has been reported that the elevated pressure, increased temperature and vigorous mixing supplied by either acoustic and/or hydrodynamic cavitations both initiate and accelerate numerous reactions and processes. Enhancing the reactions and processes by means of the energy released upon the collapse of the cavities in the flow has found application in a number of technologies that are used for upgrading, mixing and pumping, and expedition of chemical conversions. While extreme pressure or tremendous heat can be detrimental, the outcome of controlled processing is beneficial.

Cavitation can be of different origins, such as hydrodynamic, acoustic, laser-induced or generated by the direct injection of steam into a sub-cooled fluid, which produces collapse conditions similar to those of hydrodynamic and acoustic cavitations (Young, 1999; Gogate, 2008; Mahulkar et al., 2008). Direct steam injection cavitation coupled with acoustic cavitation exhibits up to 16 time's greater efficiency, as compared to acoustic cavitation alone.

Hydrodynamic cavitation is the phenomenon of the formation of vapor cavities in fluid flow, which is followed by bubble collapse in a higher-pressure zone. In practice, the process is carried out as follows. The fluid is fed in the device's inlet passage. In a localized zone, the flow accelerates causing its pressure to drop (Bernoulli's principle). This results in the formation of bubbles composed of the vapors of compounds that boil at given condition. When the bubbles move beyond the boundary of the localized zone, the pressure in the flow increases, and the bubbles collapse, exposing the vapors found within to a high pressure and temperature, shearing forces, shock waves, acoustic vibration and/or electromagnetic irradiation. Each cavitation bubble serves as an independent mini-reactor, in which chemical and physical alterations are taking place. The pressure and temperature are significantly higher than in many industrial processes. The further alteration of fluid composition results from chemical reactions taking place in adjacent layers of fluid.

When the fluid's temperature approaches its boiling point, the formation of bubbles is noticeable. If fluid is pressured in a hydrodynamic cavitator at a suitable velocity, as a result of the decreased hydrostatic pressure (Bernoulli's principle), the cavitation bubbles will form at a concentration of hundreds in 1 mL. Their formation can be avoided by an increase in pressure. Small particulate and impurities serve as nuclei for the cavitation bubbles, which may reach several millimeters in the diameters, depending on the conditions. The bubbles take up space normally occupied by fluid, resisting to the flow and increasing the pressure. If the cavities relocate in a slow-velocity, high-pressure zone (reversed Bernoulli's principle), they will implode within a short time of $10^{-8}$-$10^{-6}$ s. The implosion is accompanied by drastic jump in both pressure and temperature, up to 1,000 atm and 5,000° C., correspondingly, and results in the formation of the local jet streams with the velocities of 100-m/s and higher (Suslick, 1989; Didenko et al., 1999; Suslick et al., 1999; Young, 1999). The main disadvantage of an excessively high pressure is excessive heat release, which may become a problem if overheating is detrimental to the products' quality and safety. The collapse of cavities is accompanied by generation of shock waves, vigorous shearing forces, and heating, and releases a significant amount of energy, which activates atoms, molecules and radicals located within the gas-phase bubbles and the atoms, molecules and radicals within the surrounding fluid, and initiates chemical reactions and processes and/or dissipates into the surrounding (Sharma et al., 2008; Kalva et al., 2009). In many cases, the cavity implosion is light emission-free. Often, it is accompanied by emission of ultraviolet and/or visible light, which may induce photochemical reactions and generate radicals (Zhang et al., 2008).

The cavitation phenomenon is categorized by the dimensionless cavitation number $C_v$, which is defined as: $C_v=(P-P_v)/0.5 \rho V^2$, where P is the recovered pressure downstream of the constriction, $P_v$ is the vapor pressure of fluid, V is an average velocity of fluid at the orifice, and $\rho$ is its density. The cavitation number, at which the cavitation starts, is cavitation inception number $C_{vi}$. Cavitation ideally begins at $C_{vi}=1$, and the $C_v<1$ implies a high degree of cavitation (Gogate, 2008; Passandideh-Fard and Roohi, 2008). The effect of surface tension and size of cavities on the hydrostatic pressure is defined as follows: $P_i=P_0+2a/R$, where $P_i$ is the hydrostatic pressure, a is the surface tension, and R is the radius of the bubble. The smaller the bubble, the greater the energy released during its implosion. Another important term is the processing ratio, which is a number of cavitation events in a unit of flow.

The cavitation is more dramatic in viscous fluids. For example, if crude oil flow moves at a proper speed causing its pressure to reach the vapor pressure of some hydrocarbon(s) constituents, cavitation will occur. The cavitation separates the liquid-phase high-boiling-point compounds and their particles suspended in liquid compounds from the entrapped gases, water steam and vapors of the affected compounds.

Processing fluids with cavitation generated by the sound waves lying in either acoustic (frequency is 20 Hz-20 KHz) or ultrasound (frequency>20 KHz) ranges does not offer an optimized method. Disadvantage of the processing is its batch environment. In many cases, the technology could not be applied efficiently in a continuous process, because the energy density and the residence time would be insufficient for the high throughput. For instance, the intensity threshold of ultrasound cavitation in water exceeds 0.3 W/cm². The sound cavitation technology suffers from other drawbacks. Since the effect diminishes with increase in a distance from the radiation source, the treatment efficacy depends on a container size and is low with large vessels. In addition, alterations in the fluid under treatment are not even and take place at the specific locations, depending on the radiation frequency of the source. Thus, the efficacy of the sound treatment further decreases.

The hydrodynamic cavitation device does not require using any vessel, as do the sound or ultrasound-induced cavitations. At the present time, numerous flow-through hydrodynamic cavitation devices are known. See, for example, the U.S. Pat. No. 6,705,396 to Ivannikov et al. and the U.S. Pat. Nos.

7,207,712, 6,502,979 and 5,971,601 to Kozyuk that describe different hydrodynamic cavitation systems and their practical usage.

U.S. Pat. No. 7,338,551 to Kozyuk discloses device and method for generating bubbles in liquid that passes through a first local constriction of the hydrodynamic cavitation device at a velocity of at least 12 m/s and then is mixed with gas to affect implosion within the second cavitation field. Although this device provides two zones of the cavitation, its efficiency may become unsatisfactory when the higher number of the consecutive cavitations is desired.

Another approach illustrated in the U.S. Pat. No. 5,969,207 to Kozyuk uses a flow-through passage accommodating a baffle body that generates a hydrodynamic cavitation with the degree of cavitation of at least 1 to initiate chemical reactions and change qualitative and quantitative composition of liquid hydrocarbons.

The patent of Russia No. 2158627, B 01 J 5/08 introduces the cavitation mixer comprising a cylindrical working chamber, a nozzle shaped as a convergent cone for fluid feeding and a cone nozzle for discharging the atomized fluid. The chamber inlet houses a multi-jet nozzle for fluid mixing, which is followed by a nozzle for an optional introduction of the additional reagents. The working chamber has a circular threshold-shaped runner attached to its interior. The inner surface of the chamber's back comprises the radial longitudinal ribs. It should be noted, that the device is not capable of generating uniform cavitation field within the chamber, and, as a result, the efficiency of processing is insufficient.

In the present time, with the cost of energy rapidly rising, it is highly desirable to reduce time and lower energy consumption to secure a profit margin that is as large as possible. However, prior art techniques do not offer the most efficient method of blending and upgrading fluids, especially complex mixtures and non-Newtonian viscous liquids, in the shortest amount of time possible.

Thus, a need exists in an advanced flow-through device for the complex fluid processing with a minimal time treatment and energy cost that would result in products with improved characteristics that would be easier to handle. The advanced, compact, and highly efficient device is particularly needed at the mining locations and refineries, where throughput is a key factor. Several other objects and advantages of the present invention are:

(1) to provide a flow-through hydrodynamic multi-stage cavitation device for processing fluids in a an expedited manner with the optimized energy costs;

(2) to make easier operation, improve productivity and reduce room taken up by the processing equipment;

(3) to provide conditions for mixing and altering fluids by passing them through the cavitation vortices and bubbles generation zones as well as working chambers with the high fluid pressure for the cavitation bubbles' implosion at the gradually increasing temperature, decreasing the cavitation thresholds;

(4) to provide conditions for the gradual, cascade, multi-step alteration of fluids by subjecting the original constituents of the said fluids to the first cavitation event followed by subjecting the residual original compounds and products of the reactions to the second cavitation event, and etc.

(5) to provide a device for manipulating fluids at the site of their production;

(6) to provide conditions to obtain changes in crude oil resembling those of thermo cracking;

(7) to produce even cavitation field throughout the volume and for time sufficient for synthesizing new stable molecules and producing other changes;

(8) to provide the device, wherein two or more a flow-through hydrodynamic multi-stage cavitation systems can be employed.

The present invention fulfills these needs and provides other related advantages.

SUMMARY OF THE INVENTION

The present invention provides a very unique method for manipulating fluids by using energy released during the implosion of cavitation bubbles to alter fluids.

The present invention creates beneficial conditions that cannot be duplicated, because the process's efficiency is enhanced by multiple, consecutive applications of high pressure, elevated heat, turbulence and vigorous mixing, applied in a flow-through manner within a short period. The preferred embodiments of the present invention apply optimized levels of both pressure and temperature via a controlled flow-through hydrodynamic cavitation. The process is independent of external temperatures and pressure and provides a means of changing chemical composition, physical properties and other characteristics of fluids evenly throughout the flow. In addition, important economic benefits are experienced through implementing the present invention. The optimized usage of a flow-through hydrodynamic multi-stage cavitation reactor serves to lower equipment, handling and energy costs, as it improves efficiency and productivity of the treatment.

The present invention is directed to a method for processing a fluidic mixture in a multi-stage hydrodynamic cavitation device. The method begins with introducing the fluidic mixture to an inlet on the hydrodynamic cavitation device. The fluidic mixture is then passed through a flowpath in the hydrodynamic cavitation device having at least ten cavitation zones. The fluidic mixture is then exposed to cavitation inducing features in each of the cavitation zones, which results in the formation of cavitation bubbles. The cavitation bubbles are then collapsed between two adjacent cavitation zones. Finally, the fluidic mixture is removed from an outlet on the hydrodynamic cavitation device.

One of the cavitation zones comprises a central vortex chamber, wherein the cavitation inducing feature therein comprises a cylindrical body. The cylindrical body is positioned proximate to the center of the flowpath and includes perimeter flow guides around the perimeter of the cylindrical body. Another of the cavitation zones comprises a turbulizer disk, wherein the cavitation inducing feature comprises a hole proximate to the center of the flowpath and curved flow guides running from the hole to a perimeter of the turbulizer disk.

Yet another cavitation zone comprises a toroidal vortex chamber adjacent to the flowpath, wherein the cavitation inducing feature comprises the toroidal vortex chamber itself and an opening thereto. A further cavitation zone comprises a working chamber, wherein the cavitation inducing feature comprises a top niche in a hemi-spherical body. The hemi-spherical body is disposed proximate to the center of the flowpath.

Still another of the cavitation zones comprises a radial multi-jet nozzle disposed in the flowpath, wherein the cavitation inducing feature comprises a plurality of through channels radially disposed about a perimeter region of a surface of the radial multi-jet nozzle. Another of the cavitation zones comprises a disk multi-jet nozzle disposed in the flowpath, wherein the cavitation inducing feature comprises a plurality of through channels disposed across a surface of the disk multi-jet nozzle. In another embodiment, the cavitation zones may comprise ten disk multi-jet nozzles disposed along the flowpath. On each disk multi-jet nozzle, the cavitation inducing feature comprises a plurality of through channels disposed across a surface of each disk multi-jet nozzle. The channels each have expansions and contractions of their cross-sectional areas along their length. The cross-sectional area of each through channel of the disk multi-jet nozzles preferably obeys the formula:

$$1.0 \leq \frac{S_{n+1}}{S_n} \leq 1.1,$$

where n is a counter equal to the number of a particular disk multi-jet nozzle along the flowpath. In addition, the number of through channels in each disk multi-jet nozzle is preferably sufficient so as to satisfy the formula:

$$\frac{S_d}{S_D} \leq 0.8,$$

where $S_d$ equals the sum of the largest cross-sectional area of each through channel on a particular disk multi-jet nozzle and $S_D$ equals the area of the surface of the particular disk multi-jet nozzle.

The present invention is also directed to a multi-stage hydrodynamic cavitation device for processing a fluidic mixture. The device comprises a generally cylindrical housing having an inlet, an outlet, a flowpath therebetween, and a plurality of cavitation zones along the flowpath. A disk multi-jet nozzle comprises two or more of the cavitation zones along the flowpath. A plurality of through channels is disposed across a surface of each disk multi-jet nozzle. Each channel includes expansions and contractions of its cross-sectional area along its length.

In one embodiment, there are at least ten cavitation zones, each cavitation zone including a disk multi-jet nozzle. In this embodiment, the cross-sectional area of each through channel of the disk multi-jet nozzles obeys the formula:

$$1.0 \leq \frac{S_{n+1}}{S_n} \leq 1.1,$$

where n is a counter equal to the number of a particular disk multi-jet nozzle along the flowpath. Further, the number of through channels in each disk multi-jet nozzle is sufficient so as to satisfy the formula:

$$\frac{S_d}{S_D} \leq 0.8,$$

where $S_d$ equals the sum of the largest cross-sectional area of each through channel on a particular disk multi-jet nozzle and $S_D$ equals the area of the surface of the particular disk multi-jet nozzle.

In another embodiment, one of the cavitation zones comprises a central vortex chamber disposed along the flowpath between the two cavitation zones comprised of the disk multi-jet nozzles. The central vortex chamber encloses a cylindrical body having perimeter flow guides. The cylindrical body is disposed proximate to the center of the flowpath.

Another of the cavitation zones comprises a turbulizer disk disposed along the flowpath between the two cavitation zones comprised of the disk multi-jet nozzles. The turbulizer disk has a hole proximate to the center of the flowpath and curved flow guides running from the hole to a perimeter of the turbulizer disk.

Still another of the cavitation zones comprises a toroidal vortex chamber disposed along the flowpath between the two cavitation zones comprised of the disk multi-jet nozzles. The toroidal vortex chamber is positioned adjacent to the flowpath and in fluid communication therewith.

Yet another of the cavitation zones comprises a working chamber enclosing a hemispherical body disposed along the flowpath between the two cavitation zones comprised of the disk multi-jet nozzles. The hemispherical body is disposed proximate to the center of the flowpath and includes a top niche.

A further cavitation zone comprises a radial multi-jet nozzle disposed along the flowpath between the two cavitation zones comprised of the disk multi-jet nozzles. The radial multi-jet nozzle is disposed in the flowpath and comprises a plurality of through channels radially disposed about a perimeter region of a surface of the radial multi-jet nozzle. Each channel includes expansions and contractions of its cross-sectional area along its length.

The flowpath includes a midpoint between the inlet and outlet and the cavitation zones have a mirrored symmetry about the midpoint.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENTS

The objects of the present invention are achieved by forcing fluids in the flow-through multi-stage hydrodynamic cavitation system to induce chemical reactions and/or change physical properties of the fluids. Hydrodynamic cavitation assumes formation of the vapor bubbles within the fluid accelerated to a proper velocity. In practice, fluid is accelerated with a high-pressure pump. The phenomenon is called cavitation, because cavities form when the liquid pressure has been reduced to its vapor pressure. The vapor bubbles expand as they move and suddenly collapse upon reaching a higher-pressure region. The violent collapse causes a jump in pressure and temperature and intense shearing forces, resulting in chemical reactions. By subjecting the fluid to a flow-through hydrodynamic cavitation, molecules are activated and converted into new components.

Figure 1:
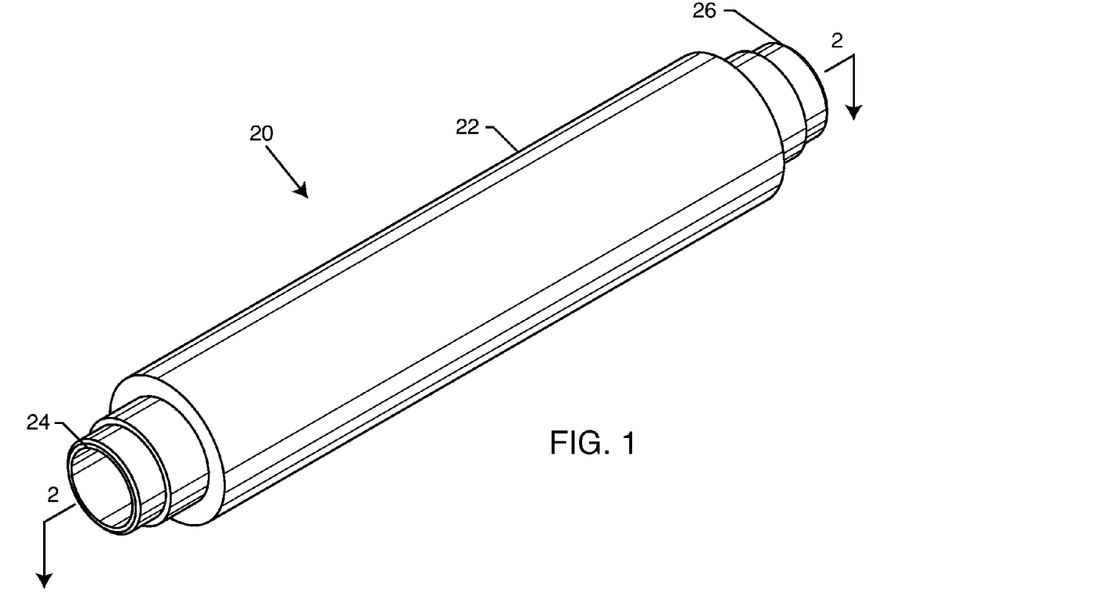
FIG. 1 is a perspective view a preferred embodiment of the present multi-stage cavitation device.

The principle diagram of the present flow-through hydrodynamic multi-stage cavitation system is shown in the FIG. 1. The device comprises a number of multi-jet nozzles, vortex elements, turbulizers, and working chambers and possesses a central mirror symmetry plane, which is perpendicular to the device's main axis. The multi-jet nozzles, vortex elements and turbulizers generate vortices and intensive turbulence in the fluid. As a result, the liquid pressure decreases to its vapor pressure at the given temperature. If the fluid pressure in the local volume is reduced to the vapor pressure, the cavitation nuclei will start increasing in size. The micro-bubbles will grow and transform into the gas-filled cavities, which collapse in the higher-pressure zone.

In order to create the most suitable conditions for pulsation and collapse of the bubbles, the present cavitation device houses a number of low-pressure and cavitation high-pressure zones, such as vortex elements and turbulizers followed by the working chambers, where the bubbles collapse. The number of processing areas (a cavity generation zone followed by a cavitation bubble implosion zone) is preferably at least eleven, which determines the overall efficiency of fluids' alteration. While the minimum number steps in such a device is one, the maximum number is theoretically unlimited. Applicants theorize that the practical limit is twelve processing areas.

Figure 2:
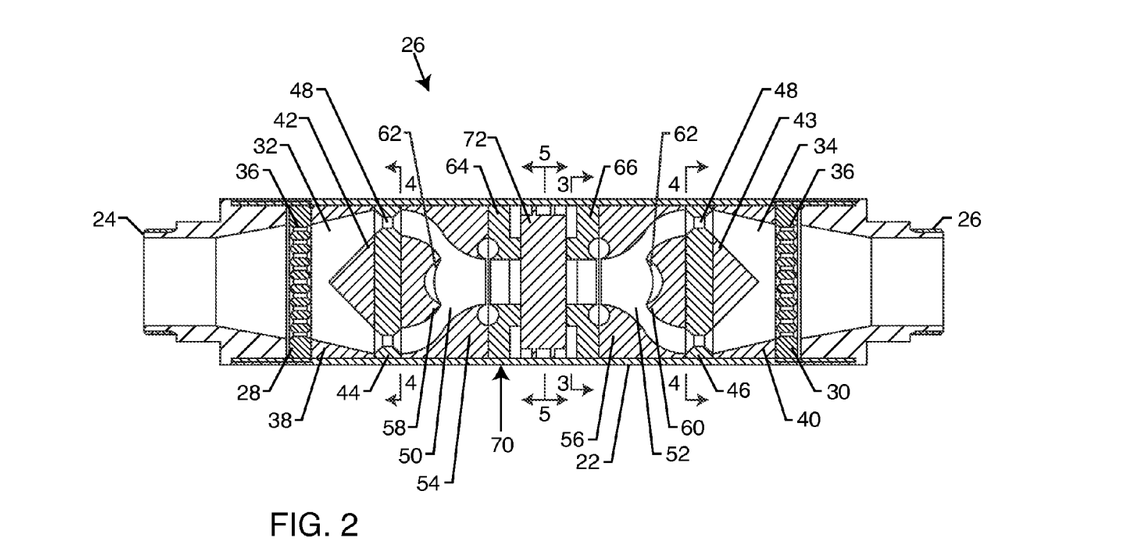
FIG. 2 is a cross-sectional view taken along line 2-2 of FIG. 1.

The flow-through cavitation device depicted in FIGS. 1 and 2 is comprised of a steel housing (22), which is attached to inlet 24 and outlet 26 pipes for direct connection to an industrial pipeline (not shown). The device 20 preferably has a mirrored symmetry such that from the inlet 24 to a mid-point 27 is repeated in reverse from the mid-point 27 to an outlet 26. The following description will follow the mirrored symmetry and describe from both the inlet 24 and outlet 26 toward the mid-point 27 simultaneously.

Assuming flow from left to right, front and end disk multi-jet nozzles 28, 30 serve as the front and back walls of exterior working chambers 32, 34 and are located behind the inlet pipe 24 and in front of the outlet pipe 26. The multi-jet nozzles 28, 30 are equipped with constricting and expanding channels 36 that are distributed uniformly over the surfaces of the disks that are the multi-jet nozzles 28, 30. The working chambers 32, 34 are comprised of radial cones 38, 44 and central guide cones 42, 43, which are attached to radial multi-jet nozzles 44, 46. The radial multi-jet nozzles 44, 46 feature both constricting and expanding channels 48. The channels 48 are spread evenly over the radial perimeter surface of the nozzles 44, 46, which direct the flow to interior working chambers 50, 52.

Flow guides 54, 56 that direct the flowpath from the perimeter to a center of the device 20 bound the chambers 50, 52. The cross-section of the flow guides 54, 56 generally has a S-shape configuration. A hemispherical body 58, 60 with a top niche 62 is mounted in the working chambers 50, 52 against the multi-jet nozzle 44, 46. The turbulizer disk 64, 66 (FIG. 3) with curved guides 68 and central hole 69 is located behind the guides 54, 56 in vortex chamber 70. The vortex chamber 70 is formed of the inner wall of the housing 22 and a cylindrical body disposed in the center. The vortex chamber 70 directs the flow from the hole 69 of the front disk 64. The holes 69 in the disks 64, 66 are coaxial. Their diameters are equal to that of holes in the guides 54, 56. The mid-point 27 is within the vortex chamber 70.

Figures 3, 4, 5:
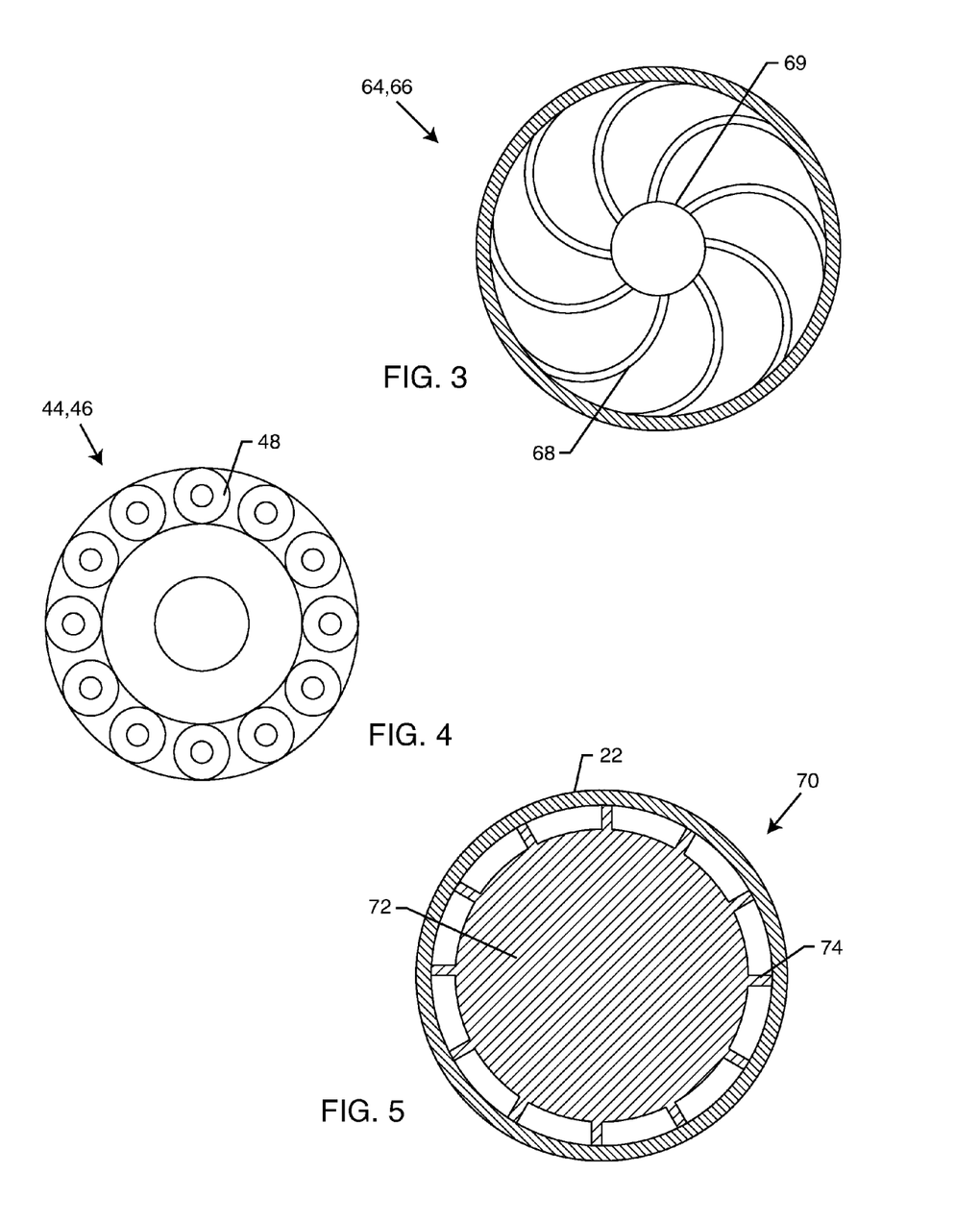
FIG. 3 is a cross-sectional view of the turbulizer disk taken along line 3-3 of FIG. 2.
FIG. 4 is a cross-sectional view of the radial multi-jet nozzle taken along lines 4-4 of FIG. 2.
FIG. 5 is a cross-sectional view of the cylindrical body taken along lines 5-5 of FIG. 2.
Figure 6:
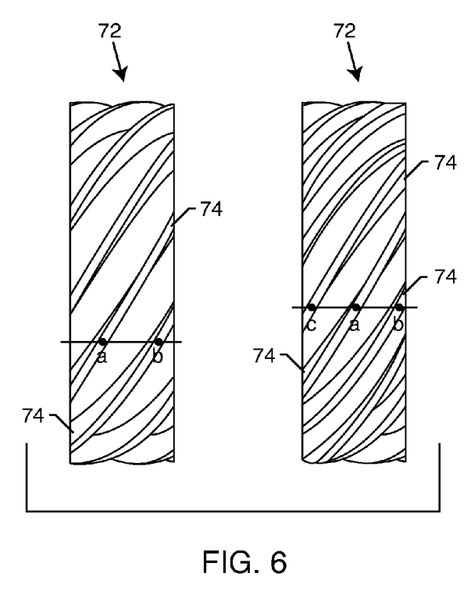
FIG. 6 is a side view of the cylindrical body.
Figure 7:
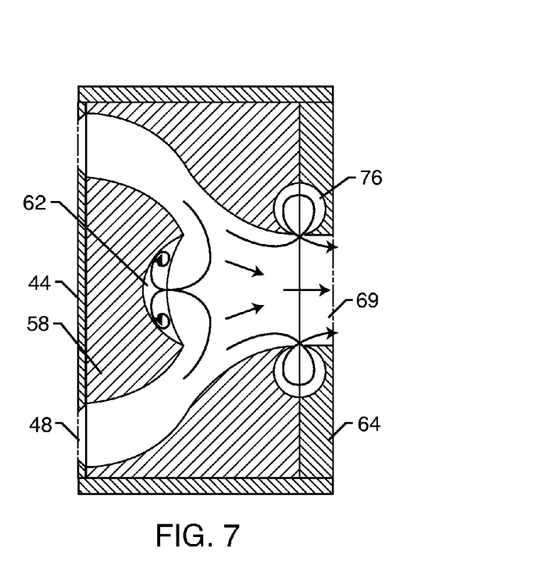
FIG. 7 is a close-up view of the front interior working chamber and toroidal vortex chamber illustrating fluid flow.
Figure 8:
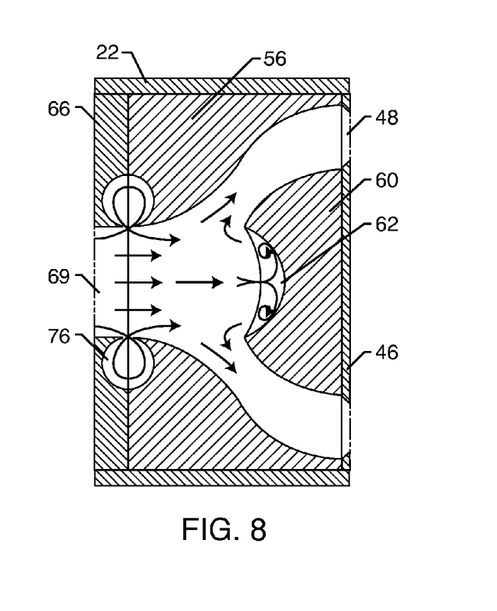
FIG. 8 is a close-up view of the back interior working chamber and toroidal vortex chamber illustrating fluid flow.
Figure 9:
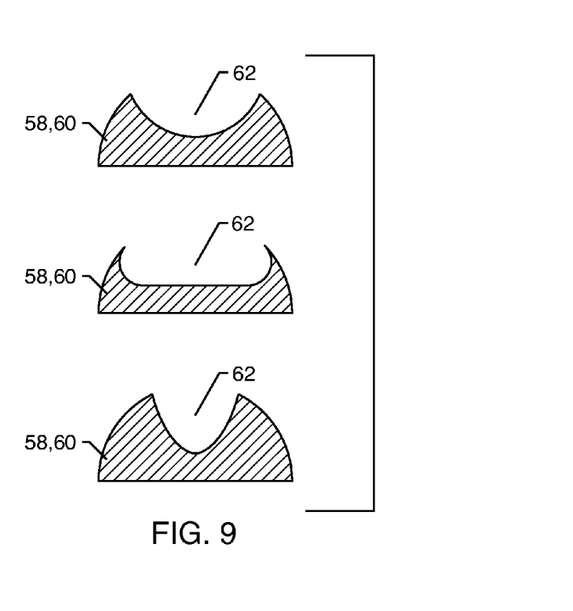
FIG. 9 is a cross-sectional view of various forms of the hemi-spherical body.

FIG. 3 is a diagram that shows disks 64, 66 with curved guides 68 and central holes 69. An interior side of the radial multi-jet nozzles 44, 46 is depicted in FIG. 4. The channels 48 let out into the working chambers 50, 52 housing the hemispherical body 58, 60 with the top niche 62. FIG. 5 shows a cross-sectional view of the cylindrical body 72, which is provided with the superficial perimeter guides 74 that serve as the channels for fluid flow. FIG. 6 is a drawing of a preferred embodiment for the guides 74 of the cylindrical body 72. FIGS. 7 and 8 depict the junction between the working chambers 50, 52 and the disks 64, 66 and illustrate fluid flow. At the junction between the guides 54, 56 and the disks 64, 66 are toroidal vortex chambers 76 which are connected to the holes 69 and working chambers 50, 52. FIG. 9 is a simplified schematic illustration showing various embodiments for the niche 62: a hemisphere, a toroid, and a parabola.

The present flow-through cavitation device (FIG. 2) operates as follows. Fluid, for example, a rough disperse emulsion, is pumped in the inlet pipe 24. The fluid moves to the multi-jet nozzle 28 and passes through its channels 36, which have both constrictions and expansions. Flowing through the channels 36 causes the formation of vortices, detached flows and cavitation. Particles of the emulsion become subjected to shear forces, and emulsion quality improves. When cavitation bubbles reach the working chamber 32 they pulsate and collapse. The bubble implosion results in increased pressure and temperature and formation of local jets that act on the emulsion particles, further improving the emulsion homogeny. Then the flow moves in a converging cone formed by the radial cone 38 and the central cone 42 that is mounted on the radial multi-jet nozzle 44. The flow is accelerated as it passes through the converging cone and then enters the channels 48, which possess both constrictions and expansions to generate vortices, detached flows and cavitation in the fluid flow.

After passing through the radial multi-jet nozzle 44, the flow moves into the interior working chamber 50 where the cavitation bubbles pulsate and implode. When fluid flow moves down along the surface of the semi-spherical body 58 it falls off the sharp edges of the top niche 62 generating toroidal vortices and a cavitation zone within the end of the working chamber 50. This cavitation field is characterized by a high intensity and a large cavity concentration. The end of the flow guide 54 is shaped as a constricting nozzle. The hole 69 in the disk 64 is shaped as an expanding nozzle in the beginning and a toroidal resonator 76 is positioned in the constrict location.

When the fluid flows along the place of the attachment of the flow guide 54 to the disk 64 it enters the ring grooves or toroidal resonator 76. The working principle of the toroidal resonator 76 is based on a high sensitivity of an symmetric flow to a side pressure. Changing pressure at the jet origination point will result in angular alteration of the fluid flow. The fluid is forced off the toroidal resonator 76 by discrete portions, which generates dynamic pulsations, vortices and cavitation. The frequency of a toroidal resonator depends on its diameter (Agranat et al., 1987).

The flow moves out of the working chamber 50, accelerating due to passing through the hole 69 in the front disk 64 and then enters channels located between the guides 68 on the front disk 64 in the vortex chamber 70. To maintain the fluid flow in a vortex state and to prevent it from moving in a plane parallel to the cavitator central axis, the guides 74 are provided on the cylinder 72 surface to direct the flow into channels 78 and sustain the spiral flow state (FIG. 5). In the vortex chamber 70, cavitation bubbles are acted upon by centrifugal and Coriolis forces. As a result, the fluidic pressure rises and the bubbles collapse.

The direction of the flow moving down the channels 78 formed by the guides 74 provided on the cylinder 72 surface is determined by the pitch angle with respect to the central axis of the cavitation device 20. In order to prevent flow from following the straight path, certain requirements must be met. Lines that are parallel to the main axis and go through any point on the surface of a guide 74 should intersect the adjacent guide. In FIG. 6, a straight line parallel to the central axis, goes through point a on the guide 74 and intersects the adjacent guide 74 at point b. The more guides that are intersected by a straight line (points c, a and b), the better the flow is twirled in the vortex chamber 70. The number of guides 74 that may be intersected by one line is limited due to the requirement that the total area of the guide channels 78 be equal to the area of the central hole 69 of the disks 64, 66. The total cross-sectional area of the channels 78 can be calculated by multiplying the number of channels by the height and width.

After passing through the channels 78 the fluid flow moves over the surface of the vortex guides 68 and enters the hole 69 in the rear disk 66. This directs the flow along the central axis of the device 20. When the fluid flow passes the rear disk 66 and rear guide 56 it enters the rear toroidal resonator 76, the working principle of which is described above. The accelerated flow falls on the top niche 62 of the rear hemispherical body 60, forming pulsating toroidal vortex and cavitations' zone (Dudzinskii and Nazarenko, 1996; Nazarenko, 1998). The pulsation frequency and the cavitation zone shape depend on the fluid properties, flow rate and the niche shape. The preferred embodiments for the niche 62 are described above.

The fluidic flow passes through the region of the toroidal resonator 76 and niche 62 and enters the working chamber 52 bounded by the rear guide 56 inner wall and the rear semispherical body 60, which direct the flow from the center to the perimeter. The cavities detached from the toroidal flow region implode in the working chamber 52. After passing the working chamber 52, the fluid flow enters channels 48 of the rear radial multi-jet nozzle 46 provided with the constrictions and the expansions. This generates vortices, detached flow jets and cavitation. When the fluid flow moves in the working chamber 34, the flow velocity decreases, the pressure goes up, and pulsation and implosion of the bubbles take place. Then the flow passes through the constrictions and the expansions 36 of the rear multi-jet nozzle 30 followed by generation of vortices, detached flow jets and cavitation. The particles of emulsion that undergo the cavitation process are reduced in size and their surfaces are modified. The cavitation bubbles pulse and implode within the working chamber 34, leading to shear force and local jet formation. Then the fluid flow exits the cavitation device through the outlet pipe 26.

This preferred embodiment of the device provides at least eleven cavitation zones: (1) the front multi-jet nozzle 28; (2) the front, radial multi-jet nozzle 44; (3) the top niche 62 in the front hemi-spherical body 58; (4) the front toroidal vortex chamber 76; (5) the hole 69 and curved guides 68 of the front disk 64; (6) the vortex chamber 70; (7) the hole 69 and curved guides 68 of the rear disk 66; (8) the rear toroidal vortex chamber 76; (9) the top niche 62 in the rear hemi-spherical body 60; (10) the rear, radial multi-jet nozzle 46; and (11) the rear-end multi-jet nozzle 30. The device design allows for two, four, six or even more mirror-symmetric cavitation regions. The plane of mirror symmetry goes through the mid-point 27 of the vortex chamber 70 located between the disks 64, 66.

One of the numerous advantages of the preferred embodiment is its versatility in respect to fluid feeding. The device 20 can be connected to a pump at either end and is especially suitable for technological applications with a demand for reversing flow direction. The device 20 can be incorporated in a pipeline without any risk of confusing inlet with outlet. The main benefit of the present flow-through cavitation device 10 is the interface of the vortex and cavitation generating zones with the higher-pressure working chambers for the cavitation bubbles' implosion.

Figure 10:
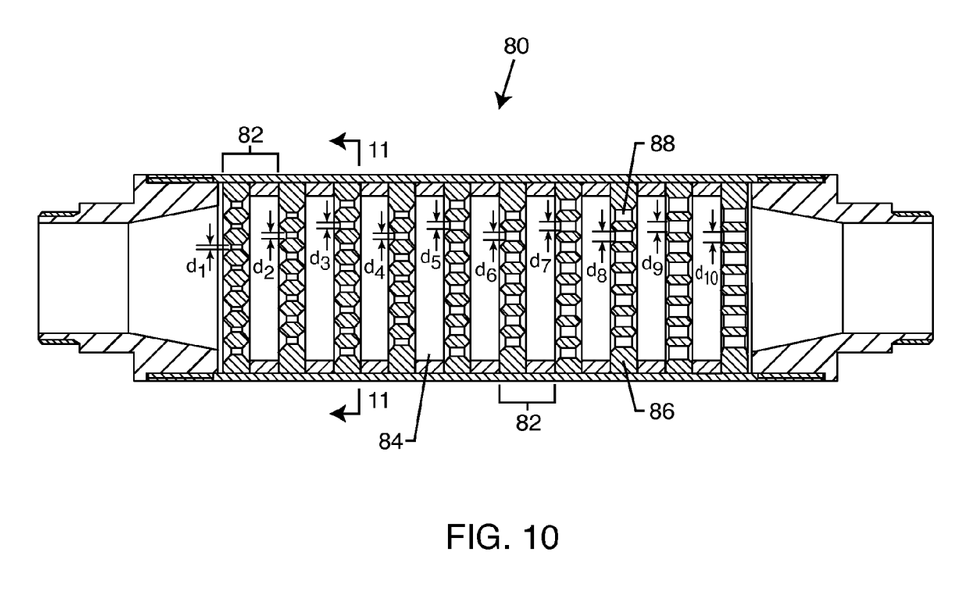
FIG. 10 is a cross-sectional view of another preferred embodiment of the multi-stage flow-through hydrodynamic cavitation device.
Figure 11:
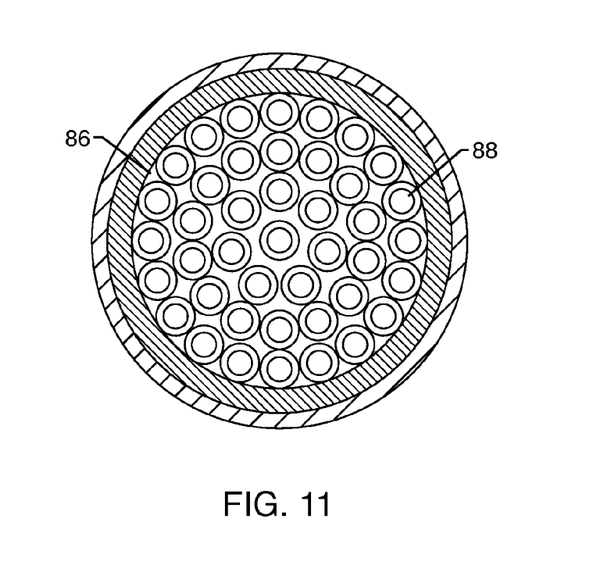
FIG. 11 is a cross-sectional view taken along line 11-11 of FIG. 10.

FIG. 10 is a drawing that shows an alternate embodiment for a flow-through multi-stage cavitation system 80 that provides as many as ten zones 82 for generation and collapse of cavitation bubbles and is comprised of ten identical working chambers 84 and ten multi-jet nozzles 86 that differ in respect to the cross-sectional passage areas created by their channels 88. When fluid is fed in the cavitation 80 device through a displacement pump or other means, the flow rate is the same within the identical, sequentially located multi-jet nozzle channels 88. Thus, it is possible to lower the fluid flow rate within the channels of nearby downstream multi-jet nozzles, while keeping the cavitation at the same level. When the fluid flow passes through the front multi-jet nozzle 86 and the working chamber 84, the cavities implode and the fluid's temperature rises. The increased temperature and amplification of the nuclei facilitate the onset of cavitation events in downstream cavitation zones. Therefore, the same cavitation number and the same cavitation bubble concentration can be achieved within downstream zones with the lower flow velocity inside the nozzle channels 88.

During multi-stage fluid processing the hydraulic resistance is reduced by meeting the following condition: The cross-sectional channel area ($S_n$) of each multi-jet nozzle is less than that of the next multi-jet nozzle ($S_{n+1}$) following the flowpath, according to the equation: $1.0 \leq S_{n+1}/S_n \leq 1.1$, where n=1, 2, 3, 4, 5, 6, 7, 8 or 9. This helps save energy required for pumping a fluid flow through the multi-zone cavitation system. To scale back the cavitation device parts, for example, the multi-jet nozzle 86, it is necessary to place the channels 88 for fluid passage as close as possible. The number of the channels 88 of the multi-jet nozzle 86 is limited by the ratio of the total area of the largest cross-sectional openings of the channels ($S_d$) to the surface area of the multi-jet nozzle ($S_D$): $S_d/S_D \leq 0.8$, where $$S_d = \sum_{i=1}^{k} S_i$$

(k is the number of channels of the multi-jet nozzle; $S_i = \pi d_i^2 / 4$, where $d_i$ is the largest diameter of the channels I, and $S_D = \pi D^2 / 4$, where D is the multi-jet nozzle diameter.

In either embodiment handling a multi-component fluid, the composition of the cavitation bubble vapors is not uniform. The cavities are enriched with the vapors of the compound(s) that are most volatile under the given conditions. The bubble implosion releases energy that drives chemical reactions and/or warms up the fluid. The processed matter contains the products of these reactions, the newly formed chemical compounds. The size of the cavities depends on the nature of the fluid under the treatment, the engineering design of the cavitation device and other conditions, such as the velocity of a flow sustained by a pump. In practice, the pump pressure is increased until a proper intensity of the cavitation field is achieved. In addition to determining the size, concentration and composition of the bubbles, and, as a consequence, the amount of released energy, the inlet pressure governs the outcome of the chemical reactions. The faster the flow moves, the smaller the cavitation number. A lower cavitation number (especially when less than one) implies a high degree of cavitation. The preferred embodiment of the present invention optimizes the cavitation to perform uniform alteration of fluids by applying the most suitable pump pressure. If too much energy is applied or the treatment time is too long, then the processing cost goes up. By applying hydrodynamic cavitation at a pump pressure designed to generate cavitation and chemical conversion evenly throughout the fluid, the change in physical and chemical properties takes place and the desirable outcome is obtained.

The devices depicted in the FIGS. 1-11 are used for carrying into effect the method, according to the present invention. In accordance with the present invention, the fluid can be treated either continuously or periodically, by passing through the multi-stage devices 20, 80 comprised of the vortices and bubbles' generating zones, as well as the higher-pressure working chambers. The systems can be placed anywhere around a production site, oil refining column or any other facility. The device may be fixed in position or movable. Placement of one device may be combined with the placement of another device in series or parallel. In practice, it is necessary to consider the cost of the device, its production capacity and operation and maintenance expenses. It should be emphasized, that an operator of the cavitation device is not required to wear the high performance safety products for hearing protection, such as earmuffs or earplugs, as it would be in a case of a high frequency acoustic cavitation.

The implosion of the cavitation bubbles results in the formation of numerous micro bubbles. Both the pressure and the temperature of the vapor contained within these bubbles are significant. If the fluid, which is enriched with these bubbles, moves to a lower-pressure zone, the bubbles will play the role of nuclei and expand enhancing the cavitation field intensity (Zhang and Chai, 2001). The repeated multiplication, expansion and implosion of the cavities lower the cavitation threshold. The bubbles grow from the nuclei, whose volume is larger than that of the originally present nuclei. This intensifies processing and allows for the carrying out of selective chemical reactions. This makes the present device unique and especially suitable for treatment of multi-component viscous fluids such as petroleum, oils, melted animal fat, cell extracts and other feedstocks of a high economical value.

With sonic and ultrasonic radiation, the results are mixed, unless cavitation is uniform throughout the liquid. However, creating an even acoustic cavitation in large commercial tanks is a particular challenge. The present device achieves prompt alteration of fluids through using the multi-stage cavitation. The cavitation employed in accordance with the preferred embodiment of the present invention is achieved with a pump pressure selected from the range of approximately 50-5,000 psi. The optimal pressure produces a sufficient amount of cavities to achieve a high degree of treatment. However, as one familiar in the art can imagine, different fluids require different energies achieved through cavitation in order for their alteration to proceed. Therefore, the range of 50-5,000 psi is in no way limited for using the present invention. Energy released because of bubble implosion during a flow-through hydrodynamic cavitation activates molecules forcing them to react and form new compounds. The result is an upgraded product of higher commercial value whose components are easier to handle.

It is an equipment cost decision which device configuration to employ, since a number of approaches are technically feasible, whether for a large scale upgrading or treatment of relatively small batches. One approach for ensuring the best conditions is to create even cavitation throughout the flow and avoid wasting energy. Ideally, the applied energy is kept at the level when cavitation still efficiently occurs and energy expenditure is minimal.

The flow-through hydrodynamic cavitation devices are designed to treat large volumes at ambient temperature and pressure. Additional lines and skid systems can be added to scale up the production capacity. These systems can be easily mounted and transported, making them suitable for production and transportation. The beneficial effects gained through the present invention cannot be achieved with a rotor-stator cavitation or sound- and ultrasound-induced cavitation because the conditions created in the multi-stage process cannot be duplicated by other means, including one- or two-stage cavitation. In the sound-induced process, cavitation bubbles form a barrier to sound transmission and attenuate the sound waves due to scattering and diversion, limiting the effective distance. Furthermore, the ultrasonic irradiation modifies liquid at the specific locations, depending on the frequency and the source power. The present invention overcomes these limitations, chemically and physically changing the composition of fluid in the uniform manner and is capable of changing molecular structures to a greater degree, by supplying enough energy to drive different reactions. Therefore, this invention provides a better means of upgrading fluids and producing superior emulsions and dispersions.

Emulsions have found numerous applications in many different industries. The emulsion stability is commonly measured in terms of the amount of oil separating from the emulsion prepared by mixing the vegetable oil and water (Mackson and Singh, 2006). Although the emulsions prepared with two non-miscible liquids are unstable and quickly separate into two phases. Their stability can be drastically improved by introducing the proper surfactants, stabilizers, nanoparticles, or other surface-acting agents and is affected by their properties and dosage, oil/water ratio, pH, temperature, mixing time, vibrations, impurities, and the stirring intensity of mixing equipment (Chen and Tao, 2005). Thus, the efficiencies of different cavitation devices can be compared by measuring the stability of water/oil emulsions prepared with these systems, in addition to the analytical technique based on the pseudo-first-order reactions of depolarization of aqueous solutions of dyes induced by cavitation due to $H_2O_2$ formation (Wang et al., 2009). The Weissler reaction of iodide oxidation to $I_3^-$ is also widely used for measurement of the intensity of both ultrasonic and hydrodynamic cavitations (Morison and Hutchinson, 2009).

Stability of the prepared emulsions is characterized with the coefficient $K_f$, calculated by using the following equation: $K_f=V_o/V$, where $V_o$ is the volume of vegetable oil separated from emulsion determined at time t and V is the total volume. The smaller the value for $K_f$, the more stable the emulsion. The energy consumed by the cavitation device per liter of prepared emulsion, $E_v$(Wh/L), is the power P(W) consumed over time t(b), divided by the emulsion volume V(L): $E_v=(P \times t)/V$. The smaller the value for $E_v$, the less energy is needed for preparation of the emulsion and the more efficient is the mixing device. The values for $E_v$ of an inventive flow-through cavitation system and a rotor-stator cavitation device were 625 and 833 Wh/L, respectively. Energy consumption of the pump and the rotor-stator cavitation device were measured with an electric meter. Both the stability of the emulsions and energy efficiency were characterized with a parameter C, values for which were calculated as follows: $C=c \times K_t \times E_v$, where c is a factor having units of L/Wh. The smaller the value for C, the more efficient is the device.

The following examples are given for illustrating the present invention and should not be construed as limitations on the scope or spirit of the invention.

EXAMPLE 1

Emulsions prepared using either the flow-through cavitation device shown in FIG. 2 connected to a wheel pump or a rotor-stator cavitation device equipped with a centrifugal pump. To prepare the emulsions, six liters of vegetable oil were fed into a closed system comprised of the cavitation device and pipeline at a low pump pressure. As soon as the oil was uniformly distributed throughout the system, six liters of water were added. The feeding rate was regulated with control valves. Then the pumps were set to the maximum pressure, and the engine of the rotor-stator device was started. Each mixture was allowed to pass through the cavitation device twenty times. The cycle number has been determined based on the output of the pump and the operation time. After completing the emulsification 0.1 L of emulsion was sampled in a measuring cylinder, and the volume of oil separated from the emulsion was measured visually in 1, 5, 10, 20, 60, 120, 360 and 600 min. The obtained data is presented in Table 1. This data confirms that the emulsions prepared with the flow-through hydrodynamic cavitation device are more stable and require less energy than those made with the rotor-stator mixer. Although there was no observable difference between the stabilities of the emulsions prepared with the inventive device and the rotor-stator cavitation systems in 600 min, the energy consumption of the flow-through cavitation system was less that of the rotor-stator device by 36%.

TABLE 1

Comparison of the kinetics of the separation of the prepared emulsions.

| t, min. | Flow-through cavitation device | | Rotor-stator cavitation device | |
| --- | --- | --- | --- | --- |
| | $K_t$ | C | $K_t$ | C |
| 1 | 0.20 | 125 | 0.20 | 167 |
| 5 | 0.23 | 144 | 0.24 | 198 |
| 10 | 0.24 | 150 | 0.26 | 217 |
| 20 | 0.24 | 150 | 0.28 | 233 |
| 60 | 0.25 | 156 | 0.29 | 242 |
| 120 | 0.28 | 175 | 0.34 | 283 |
| 360 | 0.30 | 188 | 0.40 | 333 |
| 600 | 0.48 | 300 | 0.49 | 408 |

EXAMPLE 2

Cavitation alters physical chemical properties of fluids and may substantially improve them. It is known that the proper cavitation of crude oil may increase yield of the light fractions. Cavitation separates hydrocarbon molecules and modifies them, depending on the conditions. Crude oil was fed in the flow-through cavitation device (FIG. 2) at a rate of 220 L/min (58 gal/min) at a 60-psi pump's pressure. The oil was passed through the cavitation device twenty times and then was distilled at ambient pressure. The collected data is summarized in Table 2. It can be seen that the crude oil that was processed with the inventive flow-through cavitation system is distilled at a lower temperature. The data suggest that the cavitation of crude oil has changed its properties, resulting in an increase in light fraction yield.

TABLE 2

Comparison of distillation yield of the preliminary cavitated crude oil with that of the non-treated crude oil.

| | T, ° C. | |
| --- | --- | --- |
| % Off | Crude oil processed with the cavitation device | Non-treated crude oil |
| IBP | 60 | 73 |
| 10 | 121 | 150 |
| 20 | 124 | 201 |
| 30 | 128 | 256 |
| 40 | 156 | 309 |
| 50 | 289 | 353 |
| 60 | 347 | 384 |

Although several embodiments have been described in detail for purposes of illustration, various modifications may be made without departing from the scope and spirit of the invention. Accordingly, the invention is not to be limited, except as by the appended claims.

What is claimed is:

1. A method for processing a fluidic mixture in a multi-stage hydrodynamic cavitation device, comprising the steps of:
    introducing the fluidic mixture to an inlet on the hydrodynamic cavitation device;
    passing the fluidic mixture through a flowpath in the hydrodynamic cavitation device, the flowpath having at least ten cavitation zones;
    exposing the fluidic mixture to cavitation inducing features in each of the at least ten cavitation zones to induce cavitation bubbles therein;
    collapsing the induced cavitation bubbles between every two adjacent of the at least ten cavitation zones; and
    removing the fluidic mixture from an outlet on the hydrodynamic cavitation device.

2. The method of claim 1, wherein one of the cavitation zones comprises a central vortex chamber and the cavitation inducing feature therein comprises a cylindrical body proximate to the center of the flowpath and perimeter flow guides around the cylindrical body.

3. The method of claim 1, wherein one of the cavitation zones comprises a turbulizer disk and the cavitation inducing feature therein comprises a hole proximate to the center of the flowpath and curved flow guides running from the hole to a perimeter of the turbulizer disk.

4. The method of claim 1, wherein one of the cavitation zones comprises a toroidal vortex chamber adjacent to the flowpath and the cavitation inducing feature therein comprises the toroidal vortex chamber and an opening thereto.

5. The method of claim 1, wherein one of the cavitation zones comprises a working chamber and the cavitation inducing feature therein comprises a top niche in a hemi-spherical body disposed proximate to the center of the flowpath.

6. The method of claim 1, wherein one of the cavitation zones comprises a radial multi-jet nozzle disposed in the flowpath and the cavitation inducing feature therein comprises a plurality of through channels radially disposed about a perimeter region of a surface of the radial multi-jet nozzle, wherein said through channels each have expansions and contractions of their cross-sectional areas along their length.

7. The method of claim 1, wherein one of the cavitation zones comprises a disk multi-jet nozzle disposed in the flowpath and the cavitation inducing feature therein comprises a plurality of through channels disposed across a surface of the disk multi-jet nozzle, wherein said through channels each have expansions and contractions of their cross-sectional areas along their length.

8. The method of claim 1, wherein the flowpath includes a midpoint between the inlet and outlet and the cavitation zones have a mirrored symmetry about the midpoint.

9. The method of claim 8, wherein the cavitation zones comprise ten disk multi-jet nozzles disposed along the flowpath and the cavitation inducing feature in each comprises a plurality of through channels disposed across a surface of each disk multi-jet nozzle, the channels each having expansions and contractions of their cross-sectional areas along their length.

10. The method of claim 9, wherein the cross-sectional area of each through channel of the disk multi-jet nozzles obeys the formula:

$$1.0 \le \frac{S_{n+1}}{S_n} \le 1.1,$$

where n is a counter equal to the number of a particular disk multi-jet nozzle along the flowpath.

11. The method of claim 9, wherein the number of through channels in each disk multi-jet nozzle satisfies the formula:

$$\frac{S_d}{S_D} \le 0.8,$$

where $S_d$ equals the sum of the largest cross-sectional area of each through channel on a particular disk multi-jet nozzle and $S_D$ equals the area of the surface of the particular disk multi-jet nozzle.

12. A multi-stage hydrodynamic cavitation device for processing a fluidic mixture, comprising:
a generally cylindrical housing having an inlet, an outlet, a flowpath therebetween, and at least ten cavitation zones along the flowpath;
a disk multi-jet nozzle comprising each of the at least ten cavitation zones along the flowpath;
a plurality of through channels disposed across a surface of each disk multi-jet nozzle, wherein each channel includes expansions and contractions of its cross-sectional area along its length, wherein the cross-sectional area of each through channel of the disk multi-jet nozzles obeys the formula:

$$1.0 \le \frac{S_{n+1}}{S_n} \le 1.1,$$

where n is a counter equal to the number of a particular disk multi-jet nozzle along the flowpath.

13. The multi-stage hydrodynamic cavitation device of claim 12, wherein the number of through channels in each disk multi-jet nozzle satisfies the formula:

$$\frac{S_d}{S_D} \le 0.8,$$

where $S_d$ equals the sum of the largest cross-sectional area of each through channel on a particular disk multi-jet nozzle and $S_D$ equals the area of the surface of the particular disk multi-jet nozzle.

14. A multi-stage hydrodynamic cavitation device for processing a fluidic mixture, comprising:
a generally cylindrical housing having an inlet, an outlet, a flowpath therebetween, and a plurality of cavitation zones along the flowpath;
a disk multi-jet nozzle comprising two or more of the cavitation zones along the flowpath;
a plurality of through channels disposed across a surface of each disk multi-jet nozzle, wherein each channel includes expansions and contractions of its cross-sectional area along its length; and
a central vortex chamber comprising one of the cavitation zones disposed along the flowpath between the two cavitation zones comprised of the disk multi-jet nozzles, the central vortex chamber enclosing a cylindrical body having perimeter flow guides, the cylindrical body being disposed proximate to the center of the flowpath.

15. The multi-stage hydrodynamic cavitation device of claim 14, further comprising a turbulizer disk comprising one of the cavitation zones disposed along the flowpath between the two cavitation zones comprised of the disk multi-jet nozzles, the turbulizer disk having a hole proximate to the center of the flowpath and curved flow guides running from the hole to a perimeter of the turbulizer disk.

16. The multi-stage hydrodynamic cavitation device of claim 14, further comprising a toroidal vortex chamber comprising one of the cavitation zones disposed along the flowpath between the two cavitation zones comprised of the disk multi-jet nozzles, the toroidal vortex chamber being positioned adjacent to the flowpath and in fluid communication therewith.

17. The multi-stage hydrodynamic cavitation device of claim 14, further comprising a working chamber enclosing a hemi-spherical body comprising one of the cavitation zones disposed along the flowpath between the two cavitation zones comprised of the disk multi-jet nozzles, the hemi-spherical body disposed proximate to the center of the flowpath and including a top niche.

18. The multi-stage hydrodynamic cavitation device of claim 14, further comprising a radial multi-jet nozzle comprising one of the cavitation zones disposed along the flowpath between the two cavitation zones comprised of the disk multi-jet nozzles, the radial multi-jet nozzle disposed in the flowpath and comprising a plurality of through channels radially disposed about a perimeter region of a surface of the radial multi-jet nozzle, wherein each channel includes expansions and contractions of its cross-sectional area along its length.

19. The multi-stage hydrodynamic cavitation device of claim 14, wherein the flowpath includes a midpoint between the inlet and outlet and the cavitation zones have a mirrored symmetry about the midpoint.

* * * * *